Patented July 7, 1936

2,046,432

UNITED STATES PATENT OFFICE 2,046,432

DINITROINDAZOL DYESTUFFS FOR WOOL

Emil Senn, Basel, Switzerland, assignor to the firm of J. R. Geigy S. A., Basel, Switzerland No Drawing. Application July 22, 1931, Serial No. 552,556. In Germany July 28, 1930

5 Claims. (Cl. 260—124)

This invention relates to the manufacture of new valuable brown dyestuffs by causing a 3:5-dinitro-2-halogen-benzoic acid or a substitution product thereof to react with a primary aliphatic or aromatic substitution product of hydrazine.

Generally speaking, the invention consists in condensing aromatic dinitrobodies of the benzene series of the following constitution

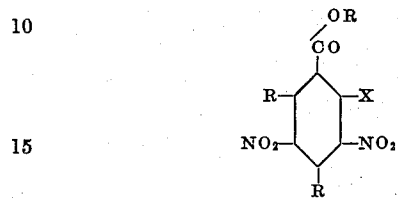

wherein X represents a halogen and R represents hydrogen or an alkyl group, in presence of a solvent, with stable primary substituted hydrazines, capable of reacting, of the formula $R^1.NH.NH_2$, wherein $R^1$ represents a p-sulphoaryl group of the benzene series.

The condensation which takes place in this process may correspond to the following chemical equation:

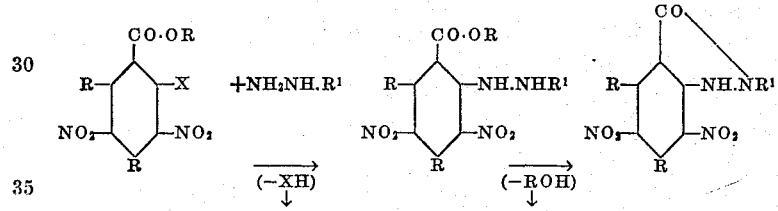

with X reacting with an H of the $NH_2$-group and OR reacting, with ring-closing, with an H of the -NH-group of said hydrazines.

The new dyestuffs dye animal fibres shades which are well levelled and are distinguished by a remarkable fastness to light. The condensation may be conducted in presence of water or of an organic solvent such as methyl or ethyl alcohol, glacial acetic acid, benzene, toluene or the like. It may be conducted with or without the addition of an acid binding agent, such as sodium acetate, potassium acetate, magnesia etc.

The following example illustrates the invention, the parts being by weight:—

188 parts of para-phenylhydrazinesulphonic acid, 246.5 parts of 3:5-dinitro-2-chlorobenzoic acid and 134 parts of crystallized sodium acetate are heated together in the necessary quantity of water for 10 hours at 95–100° C. A deep brown reaction liquid results, from which the dyestuff separates in the form of a brownish-yellow precipitate on the addition of mineral acid. The dyestuff is readily soluble in water and dyes wool in an acid bath beautiful brown shades of remarkable fastness to light.

It has the following formula:

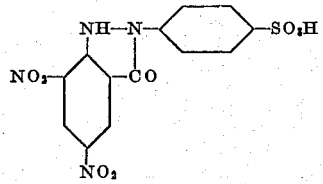

In this example, para-tolylhydrazinesulphonic acid or para-xylylhydrazinesulphonic acid may also be used.

It may be noted that in general also halogenated, for example chlorinated phenylhydrazine sulphonic acids can be used with a similar result. Methyl- or ethyl-methylesters of hydrazines are also usable. Instead of 3:5-dinitro-2-chlorobenzoic acid, there can also be used 3:5-dinitro-2-bromobenzoic acid, 3:5-dinitro-2-halogen-4-methylbenzoic acid, 3:5-dinitro-2-halogen-4-ethylbenzoic acid and so on; also their methyl- or ethylesters may be used.

What I claim is:—

1. A process for the manufacture of brown nitrodyestuffs for wool, consisting in condensing by heating aromatic dinitrobodies of the benzene series of the following constitution

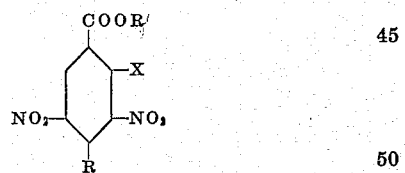

wherein X represents a halogen, and R represents hydrogen or an alkyl group, in presence of an inert solvent, with stable primary substituted hydrazines, capable of reacting, of the formula $R^1.NH.NH_2$, wherein $R^1$ represents a p-sulpho-aryl group of the benzene series, whereby X reacts with a hydrogen of the $NH_2$-group and OR with the-NH-group of said hydrazines.

2. A process for the manufacture of brown nitrodyestuffs for wool, consisting in condensing by heating aromatic dinitrobodies of the benzene series of the following constitution

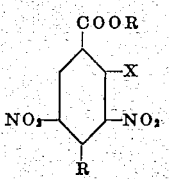

wherein X represents a halogen, and R represents hydrogen or an alkyl group, in presence of an inert solvent and with addition of an acid binding agent, with stable primary substituted hydrazines, capable of reacting, of the formula $R^1.NH.NH_2$, wherein $R^1$ represents a p-sulpho-aryl group of the benzene series, whereby X reacts with a hydrogen of the $NH_2$-group and OR with the-NH-group of said hydrazines.

3. A process for the manufacture of brown nitrodyestuffs for wool, consisting in condensing by heating a p-phenylhydrazine sulphonic acid in presence of an inert solvent with a 3:5-dinitro-2-halogenbenzoic acid.

4. A process for the manufacture of brown nitrodyestuffs for wool, consisting in condensing by heating a chlorinated p-phenylhydrazine sulphonic acid in presence of an inert solvent with a 3:5-dinitro-2-halogen benzoic acid.

5. Condensation products from primary substituted hydrazines of the benzene and naphthalene series with aromatic 2-halogen-3:5-dinitrobodies of the benzene series, said condensation products having the general formula

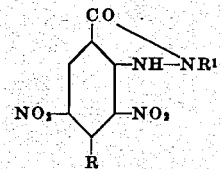

wherein R represents a hydrogen or an alkyl group, $R^1$ a p-sulpho-aryl group of the benzene series, and constituting dyestuffs dyeing wool in an acid bath brown shades well levelled and remarkably fast to light.

EMIL SENN.